United States Patent Office 2,787,579
Patented Apr. 2, 1957

2,787,579

SHAPED ACTIVATED CARBON MEDICINAL COATED WITH CARBOXYALKYL ETHER

Thonis Johannes van der Weel, Zandvoort, Netherlands, assignor to N. V. Algemeene Norit Maatschappij, Amsterdam, Netherlands, a corporation of the Netherlands No Drawing. Application June 15, 1953,
Serial No. 361,869

Claims priority, application Netherlands June 17, 1952

4 Claims. (Cl. 167—82)

It is a well-known fact that gastric and intestinal disturbances, nutritional poisonings and the like can be successfully combated by means of activated carbon, which to this end is often taken in the form of tablets, such as the well-known medicinal Norit tablets.

Practical experience has shown, however, that these tablets present some drawbacks. In the first place they tend to give off powder, so that they blacken hands and mouth. Furthermore the swallowing of these tablets may be found to be difficult, especially for children. This is, apparently, due to the adsorptive properties of the activated carbon. In many cases the gullet peristalsis is not capable of immediately conveying the tablet to the stomach, so that the patient has the disagreeable feeling that it "sticks halfway in his throat." With other tablets, which are not composed of activated carbon, these drawbacks are not encountered at all, or only to a very slight degree.

The drawbacks in question have been met by dredging the activated carbon, but it is, of course, undesirable to add to a substance, whose activity is based on its surface-active properties, extra large amounts of sugar.

According to the invention it is now possible to produce tablets, granules and similar moulded articles (which for convenience sake will be called tablets hereinafter) from activated carbon, which do not at all show the above-mentioned drawbacks, by coating the tablets with a thin film of carboxymethyl cellulose or of a similar carboxyalkyl ether of cellulose. It appears that such a film substantially entirely prevents the carbon particles from giving off powder when one touches the tablets, while as a result of the hydrophilic properties said film will rapidly absorb water when the tablets are taken, so that these will get a slippery surface and can easily pass the throat and the gullet.

The carboxyalkyl cellulose film may be very thin, and in many cases its thickness is less than 0.01 mm. Very good results can be obtained, for instance, by applying on a carbon tablet of a normal size and of a weight of e. g. 500 milligrams an amount of carboxymethyl cellulose of e. g. 1–2 milligrams, which corresponds to a thickness of a coating of about 0.003–0.006 mm. This is a very favorable circumstance, as it is undesirable to add considerable amounts of colloidal substances to the activated carbon.

It is very surprising that it is thus possible to coat a surface consisting of more or less porous, strongly adsorptive carbon particles with an extremely thin film and to obtain in this manner a "closed" surface, while unlike the case of dredging, only very small amounts of foreign substances are used and the adsorptive power does not decrease in any respect.

The film can be applied by treating the finished tablets with an aqueous solution of the carboxyalkyl cellulose, preferably by spraying this solution on the tablets and drying the latter, if necessary.

The carboxyalkylcellulose preferably used is carboxymethylcellulose. Carboxyalkylcelluloses of a similar character which may also be used according to the invention are those which are soluble in water to a viscous solution, e. g. carboxy ethyl cellulose and carboxy propyl cellulose.

I claim:

1. A medicinal preparation comprising a shaped product consisting essentially of activated carbon, said shaped product being coated with a thin hydrophilic film to substantially eliminate its tendency to give off carbon particles upon contact with other surfaces, said film consisting of water-soluble carboxyalkyl ether of cellulose and being of a thickness of less than 0.01 mm., the amount of said carboxyalkyl ether of cellulose being such that the adsorptive properties of said carbon are not materially decreased.

2. A medicinal preparation as defined in claim 1, wherein said carboxyalkyl ether of cellulose is carboxymethyl-cellulose.

3. A medicinal preparation as defined in claim 1, wherein said film thickness is from about 0.003 to 0.006 mm.

4. A medicinal preparation comprising a shaped product consisting essentially of activated carbon, said shaped product being coated with a thin hydrophilic film to substantially eliminate its tendency to give off carbon particles upon contact with other surfaces, said film consisting of carboxymethylcellulose and being of a thickness of from about 0.003 to 0.006 mm., the amount of said carboxymethylcellulose being such that the adsorptive properties of said carbon are not materially decreased.

References Cited in the file of this patent

UNITED STATES PATENTS

| | | |
|---|---|---|
| 1,542,006 | Sauer | June 16, 1925 |
| 1,552,549 | Eicher | Sept. 8, 1925 |
| 2,196,768 | Hiatt | Apr. 9, 1940 |
| 2,502,809 | Vogelsang | Apr. 4, 1950 |

OTHER REFERENCES

Hollabaugh et al.: Ind. and Eng. Chem., October 1945, p. 945.